No. 866,389. PATENTED SEPT. 17, 1907.
A. ROSENTHAL.
BELT SHIFTER.
APPLICATION FILED APR. 4, 1907.
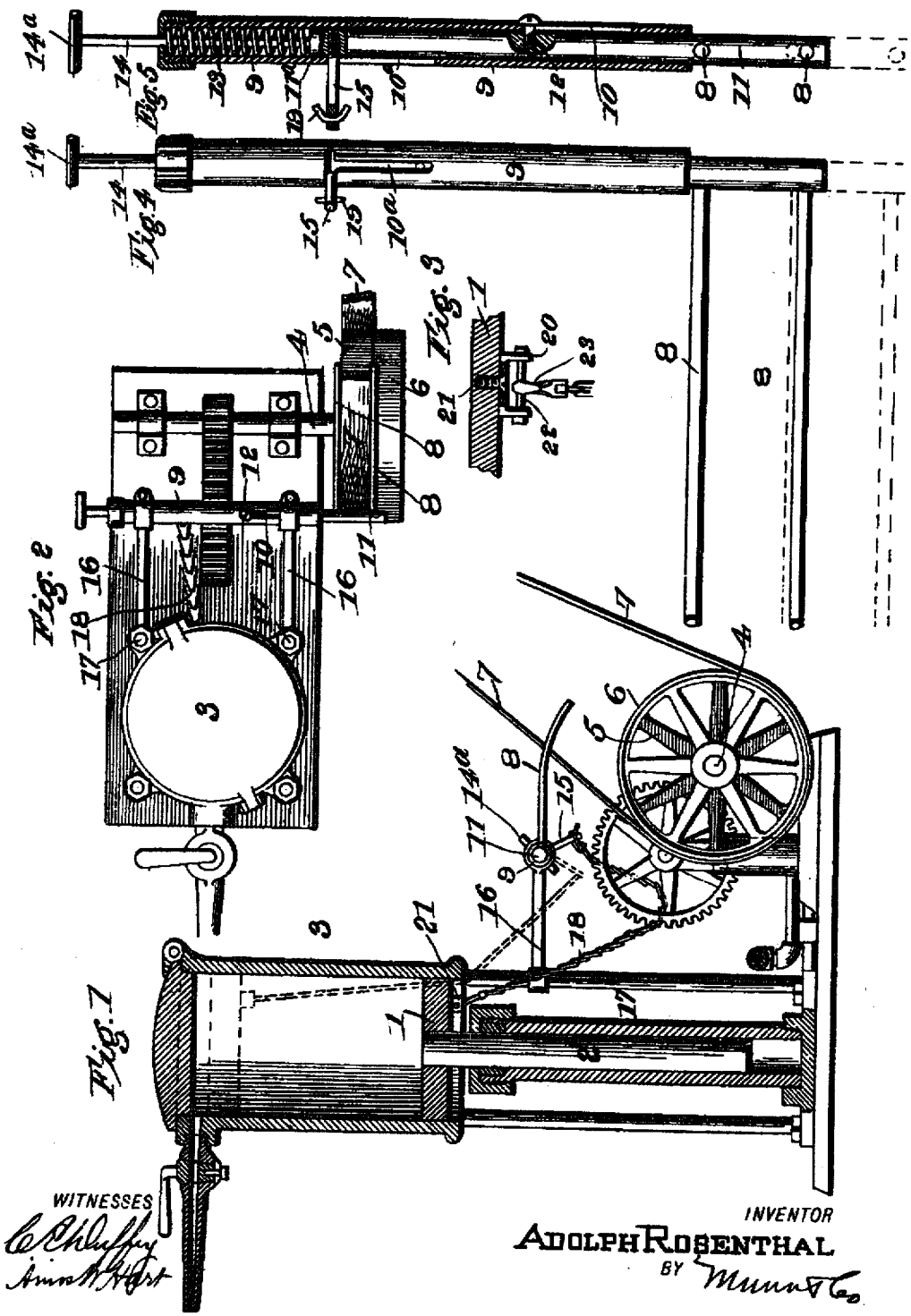
INVENTOR
ADOLPH ROSENTHAL

UNITED STATES PATENT OFFICE.

ADOLPH ROSENTHAL, OF AUGUSTA, GEORGIA.

BELT-SHIFTER.

No. 866,389.      Specification of Letters Patent.      Patented Sept. 17, 1907.

Application filed April 4, 1907. Serial No. 366,359.

*To all whom it may concern:*

Be it known that I, ADOLPH ROSENTHAL, a citizen of the United States, and a resident of Augusta, in the county of Richmond and State of Georgia, have invented an Improved Belt-Shifter, of which the following is a specification.

My invention is a belt shifter adapted to be tripped and then to operate automatically for stopping a machine when a certain movement thereof has been made. In the accompanying drawing I illustrate the invention as applied in connection with the follower or piston of a hydraulic press in such manner that the driving belt is shifted from a fast pulley to a loose or idle pulley when the follower has made the movement required for compressing or expelling the contents of the cylinder.

In the accompanying drawing, Figure 1 is a side view illustrating the details of arrangement and connection of my improved belt shifter with a hydraulic press. Fig. 2 is a plan view of the same parts. Fig. 3 is a detail section showing the device by which the trip chain of the belt shifter is connected with the follower of the press. Fig. 4 is a plan view of the under side of the belt shifter proper. Fig. 5 is a longitudinal section taken in a plane at right angles to the view shown in Fig. 4.

In Figs. 1 and 2, the numeral 1 indicates the follower, 2 the piston, and 3 the cylinder of a hydraulic press. Upon the driving shaft 4 are mounted a fast or driving pulley 5, and a loose or idle pulley 6, and 7 indicates a belt which is running on the fast pulley 5. The belt is embraced or received between the parallel arms or prongs 8, constituting a part of the belt shifter proper. The other portions of the device are a tube 9 having in opposite sides longitudinal slots 10 and 10$^a$, the latter being T-shaped as shown in Fig. 4. The belt arms or prongs 8 are rigidly but detachably connected with a rod 11 which slides in one end of the tube 9, its movement being limited by a screw or pin 12 that slides in the slot 10 of the tube. In the other end of the tube 9 is arranged a block 11$^a$, and between it and the cap on the adjacent end of the tube is a spiral spring 13. A rod or stem 14 is attached to the block 11$^a$, and projects through the cap on the end of the tube and is provided with a cross handle 14$^a$. The block 11$^a$ is provided with a lateral arm or pin 15, which projects through and is adapted to slide in the T-shaped slot 10$^a$ of the tube 9. The tube 9 is held firmly but detachably in horizontal position as indicated in Figs. 1 and 2, by means of brackets or arms 16 which are suitably connected with a fixed support, in this instance with vertical posts 17 supporting the cylinder of the press. A chain 18 is attached to the under side of the follower 1 of the press, and its opposite end is connected with the pin or arm 15 before described. A device 19—see Figs. 4 and 5—is applied to the outer end of said pin to prevent accidental detachment of the chain, which is free to slide on the pin, as will be readily understood. In Fig. 3, I illustrate the particular device preferred for attaching the chain to the follower 1, the same consisting of a bracket 20 secured by a screw 21 to the follower and having a rod 22 supported in its pendent arms. The chain link or hook 23 is engaged with this rod and adapted to slide thereon.

It will now be understood that when it is desired to set the belt shifter for tripping and operating automatically at the required time, the operator seizes the handle 14$^a$ and by pulling on the same compresses the spring 13 in the tube 9 until the pin 15 in block 11$^a$ strikes the head of the T-slot 10$^a$, when the operator rotates the handle so as to cause the pin to enter one of the lateral or divergent portions of the slot and thus engage the shoulder formed thereby. Such engagement is illustrated in Fig. 4, and it is obvious that the spring will be held compressed so long as such engagement exists. Then the operator pushes the rod 11 into the tube 9 so that the prongs 8 carry the belt 7 on to the driving pulley 5. The press then being put in operation, the follower 1 rises, and when it has reached a certain height, say that indicated by dotted lines Fig. 1, the chain 18 is pulled and the pin 15 thereby drawn out of the lateral portion of the slot 10$^a$ and disengaged from the shoulder so that the spring instantly forces the block 11$^a$ away from the capped end of the tube and simultaneously pushes the rod 11 further out of the tube so that the prongs or fingers 8 shift the belt 7 from the driving pulley 5 on to the idler 6, thereby arresting the operation of the press. The screw 12 limits the movement of the rod 11, and the pin 15 likewise limits the movement of the block 11$^a$ in the tube, so that the spring cannot move either the block or rod too far. When the piston and follower of the press descend, the chain 18 is slackened as before, and as indicated by full lines Fig. 1, and the belt shifter may then be again set as before and as indicated in Figs. 4 and 5, in readiness to be tripped as already explained.

The object in making the slot 10$^a$ T-shaped is to enable the belt shifter to be applied on either side of a press or other machine. It is possible to compress the spring and thus set the belt shifter without using the stem and handle 14, 14$^a$, since the projecting arm or pin 15 may be seized and serve as a means for pulling the block 11$^a$ back against the tension of the spring and engaging the pin with the shoulder of the slot. It will be seen that the part 9 serves as a guide for the movable parts that it incloses; also, that the rod 11 is in contact with the block 11$^a$ when the belt shifter is set ready to be tripped. The prongs 8 are preferably screwed into the rod 11 and may therefore be readily detached. The screw 12 and the pin 15 are also detachable so that the parts of the belt shifter may be readily detached for convenience of packing or shipment, and as readily put together again.

The prongs 8 and the rod 11 constitute in themselves a means for shifting the belt from the fast to the loose pulley, and the reverse, which may be used independently of the other slidable parts arranged in the tube 9. Such operation of the shifting device proper is often necessary in operating certain machines, particularly the class of small presses to which the shifter is shown applied. In other words, it is often necessary to expel only a small portion of the contents of the cylinder 3, and in such case the belt is shifted from the driving to the loose pulley without being tripped automatically. Such shifting movement is accomplished by the operator seizing the outer prong 8 close to the rod 11 and pulling or pushing as the case may be.

It will be understood that I design my invention for application to any form of machine in which a belt requires to be shifted from a driving to a loose pulley, and the form of support or means for attaching the same to such machine may be varied at will.

I claim:

1. The improved belt shifter comprising a tube having a shouldered slot, a rod slidable in said tube and provided with lateral prongs for receiving a belt, a block which is slidable in the other end of the tube, and provided with a lateral arm projecting through the shouldered slot, a spring arranged between the block and the adjacent end of the tube, and means for connecting the said lateral arm with a movable part of a machine, substantially as shown and described.

2. The improved belt shifter comprising a tube provided with opposite lengthwise slots, one of which is provided with a laterally divergent portion forming a shoulder, a rod which is slidable in one end of the tube and provided with means for engaging a belt, a pin attached to such rod and sliding in one of the slots of the tube, a block which is slidable in the other end of the tube, and provided with a lateral arm working in the shouldered slot, a spring pressing upon the block, a stem or rod connected with the block and extending from the adjacent end of the tube for use in compressing the spring and setting the belt shifter, and a device attached to the projecting arm of the block, and adapted for connection with a movable part of a machine for tripping the belt shifter in the manner described.

3. The combination with a movable part of a machine, of the belt shifter comprising a tubular guide, a part sliding therein and provided with means for engaging a belt, a spring arranged in the guide and adapted to act on the said device for shifting it when tripped, a trip arm adapted for detachable engagement with the tubular guide, and means for connecting the arm with the movable part of the machine, as shown and described.

ADOLPH ROSENTHAL.

Witnesses:
SOLON C. KEMON,
AMOS W. HART.